United States Patent
Kanehara

(10) Patent No.: US 6,233,258 B1
(45) Date of Patent: May 15, 2001

(54) ATM CELL MULTIPLEXING SYSTEM

(75) Inventor: Fumikazu Kanehara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/090,872

(22) Filed: Jun. 5, 1998

(30) Foreign Application Priority Data

Jun. 13, 1997 (JP) .................................. 9-171231

(51) Int. Cl.[7] .................................. H04L 12/56
(52) U.S. Cl. .................................. 370/537; 370/395
(58) Field of Search .................................. 370/395, 390, 370/537, 538, 540, 474, 434, 528, 535

(56) References Cited

U.S. PATENT DOCUMENTS

| | | | |
|---|---|---|---|
| 5,974,045 | * 10/1999 | Ohkura et al. | 370/395 |
| 6,021,135 | * 2/2000 | Ishihara et al. | 370/474 |
| 6,034,954 | * 3/2000 | Takase et al. | 370/362 |

FOREIGN PATENT DOCUMENTS

| | | |
|---|---|---|
| 1-175431 | 7/1989 | (JP) . |
| 2-67848 | 3/1990 | (JP) . |
| 8-223217 | 8/1996 | (JP) . |

OTHER PUBLICATIONS

English translation of Japanese Office Action dated Feb. 8, Hei 11.
"Recommendation I.363," pp. 1–22, Mar. 1993.

* cited by examiner

Primary Examiner—Douglas Olms
Assistant Examiner—Ken Vanderpuye
(74) Attorney, Agent, or Firm—McGuireWoods LLP

(57) ABSTRACT

An ATM multicast communication system for identifying and multiplexing ATM cells at a receiving node by using AAL5 cell. This system has an insertion means for inserting ATM cell having RC (Routing Cell) with past record information or route information, when ATM cell of AAL5 is multiplexed. As multiplexing may occur several times on the communication line, RC acts not only as the identifier between the multiplexed cells, but also as the carrier of the past record of multiplexing. More specifically, the ATM cells transported from plural different input ports are multiplexed in the multiplexing equipment. Every time the destined input port is exchanged, the RC is inserted in front of said ATM cell. At receiving node, the RC is monitored, and the following ATM cells are distributed for each RC.

7 Claims, 7 Drawing Sheets

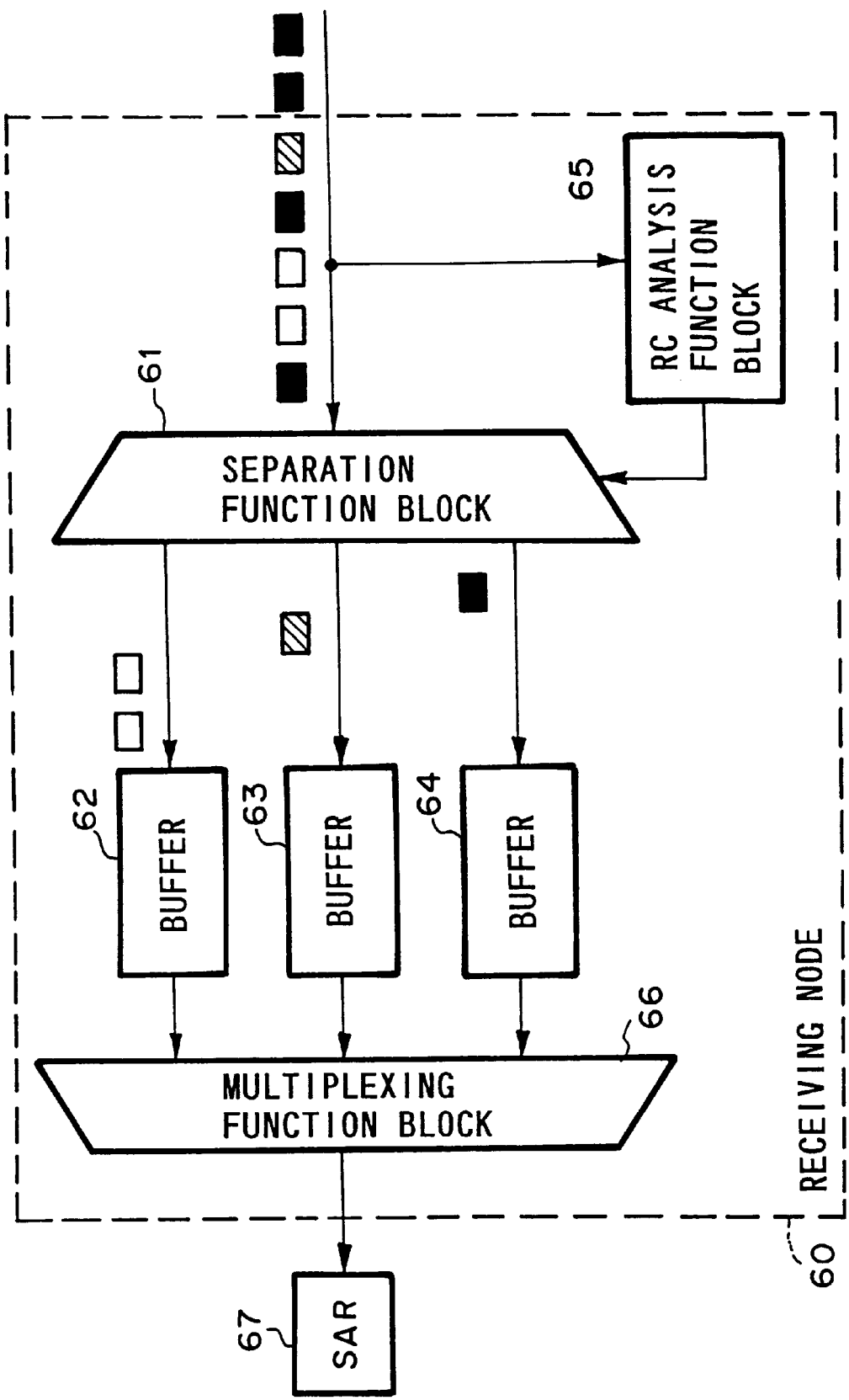

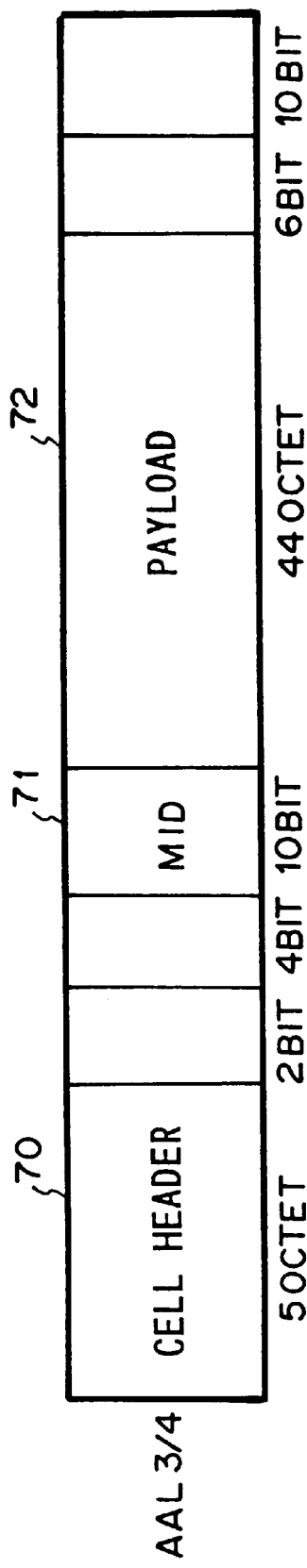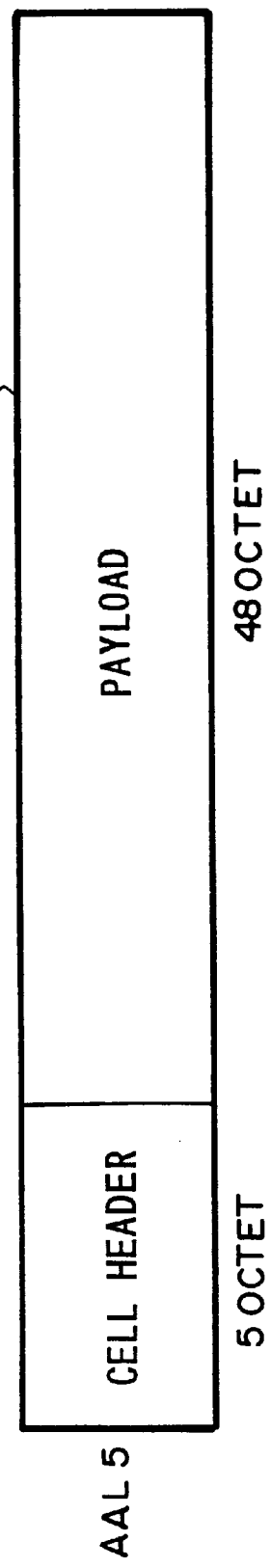
FIG. 7(a)
FIG. 7(b)

ATM CELL MULTIPLEXING SYSTEM

BACKGROUND OF THE INVENTION

1. Field of the Invention

The present invention relates to a multiplexing method and equipment for the multicast communication (selectively simultaneous communication) in ATM(Asynchronous Transfer Mode) communication.

2. Description of the Prior Art

There is known a multicast connection as one of the techniques supporting the multicast communication in ATM communication. In the point to multi point connection, among them, ATM cells from different transmitting nodes toward one receiving node are multiplexed into one UNI (User Network Interface) when transmitted. In this case, it is necessary that, at the receiving node, the ATM cells with the same VPI/JVCI (Virtual Pass Identity/Virtual Channel Identity) addresses be identified for each receiving node and be re-combined into a packet of (ATM Adaptation Layer).

Hitherto, the above mentioned identification was implemented by by using MID (Multiplexing Identification) field of AAL3/4, as shown in ITU-T 1.363.

The ATM cell format of AAL3/4 is shown in FIG. 7. As shown in (a) of FIG. 7, the ATM cell of AAL3/4 has 10 bit MID field 71 for multiplexing. When the value of this field is set so as to be different for each receiving node, multiplexed ATM cells can be identified at the receiving node.

As shown in FIG. 7, comparing the ATM cell of AAL3/4 with the ATM cell of AAL5 as recommended by ITU-T, the payload 73 of ATM cell of AAL5 is 48 octet payload, while that of AAL3/4 is 44 octet and therefore, has greater overhead than AAL5. Accordingly, the communication by using the ATM cell of AAL3/4 is less efficient than AAL5. Furthermore, the ATM cell of AAL3/4 is costly and complex in management, because AAL3/4 has 5 functional fields including MID field 71 in addition to the cell header.

On the other hand, when more efficient AAL5, instead of AAL3/4, is employed for multiplexing, there is the disadvantage that the multiplexed cells per se can not be distinguished at receiving node, because AAL5 has not any identification field corresponding to the MID field of AAL3/4 for multiplexing.

SUMMARY OF THE INVENTION

Therefore, an object of the present invention is to identify cells at receiving node, by using AAL5 in cell multiplexing for multicast communication, by using AAL5.

Another object of the present invention is to improve efficiency and performance of ATM multicast communication, by constructing a multiplexing system, wherein the received cells can be identified at receiving port by using AAL5 which is more efficient than AAL3/4.

In accordance with the present invention, there is provided an ATM cell multiplexing system, which comprises ATM cell multiplexing means for inserting the ATM cells that have past record information or route information, as routing cell, when multiplexing said ATM cells inputted at different plural ports, and separation means for receiving said ATM cells, detecting routing cells from said ATM cells, separating said ATM cells on the basis of the information of said routing cells.

Further, in accordance with the present invention, there is provided a method of ATM communication wherein packets are transmitted as cells, which comprises the step of inserting routing cell to identify multiplexed ATM cells in receiving node, when multiplexing said ATM cells inputted at different plural ports.

As a result of inserting RC (Routing Cell), the present invention can improve the efficiency and the performance of ATM multicast communication, by implementing a multiplexing system such that the received cells can be identified at receiving node, by using AAL5 which is more efficient than usual AAL3/4.

BRIEF EXPLANATION OF THE DRAWINGS

FIG. 6 is a figure showing an example of the structure of the receiving node in the present invention.

FIG. 7 (*a*) and FIG. 7 (*b*) show the ATM format of AAL3/4 and AAL5.

DESCRIPTION OF THE PREFERRED EMBODIMENTS

Figure 2:
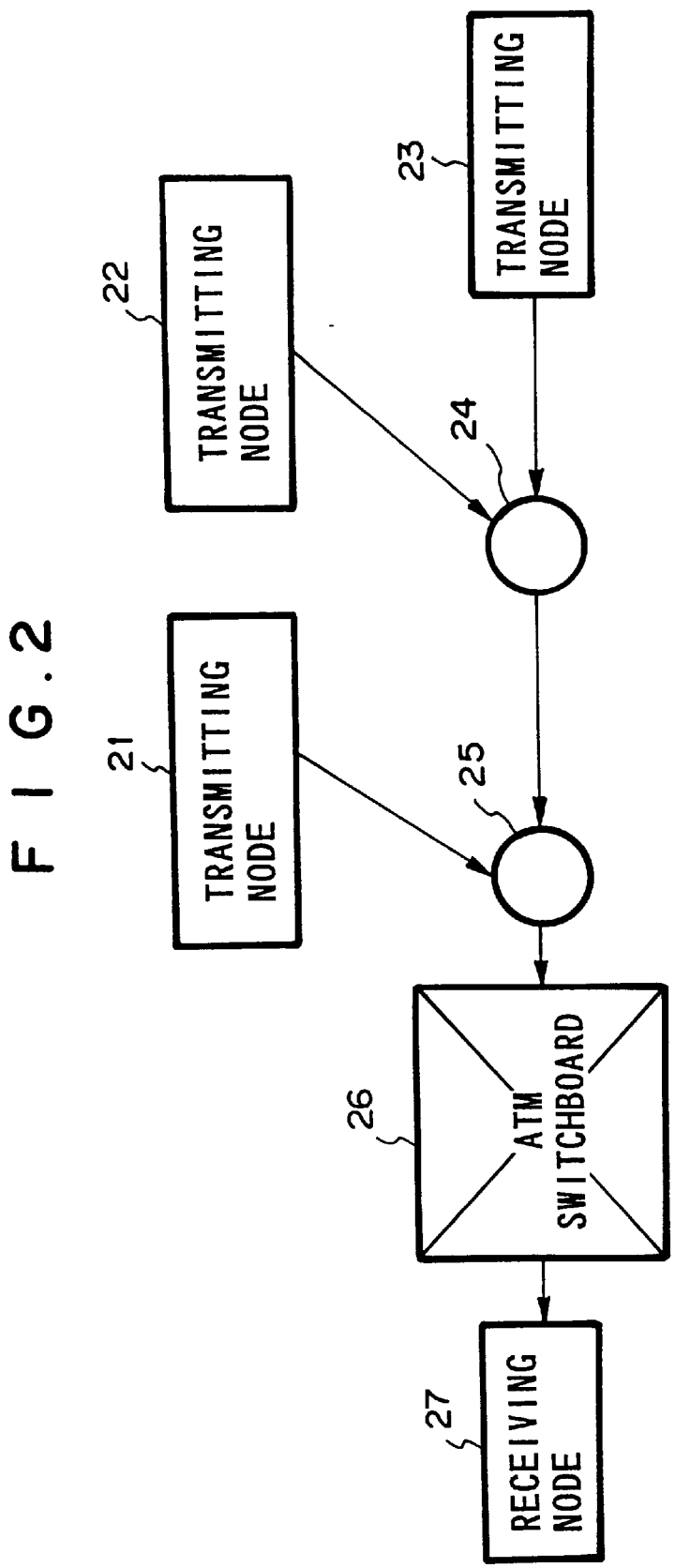
FIG. 2 is a block diagram explaining the whole system construction of the present invention.

Referring to the accompanying drawings, the preferred embodiments of the present invention is explained. At first, an example of the construction of the whole system is shown in FIG. 2. The ATM cells of AAL5 transmitted to receiving node 27 from transmitting node 21, 22 and 23 are multiplexed at multiplexing connection point 24 and 25, and received at receiving node 27 through ATM switchboard 26.

Figure 3:
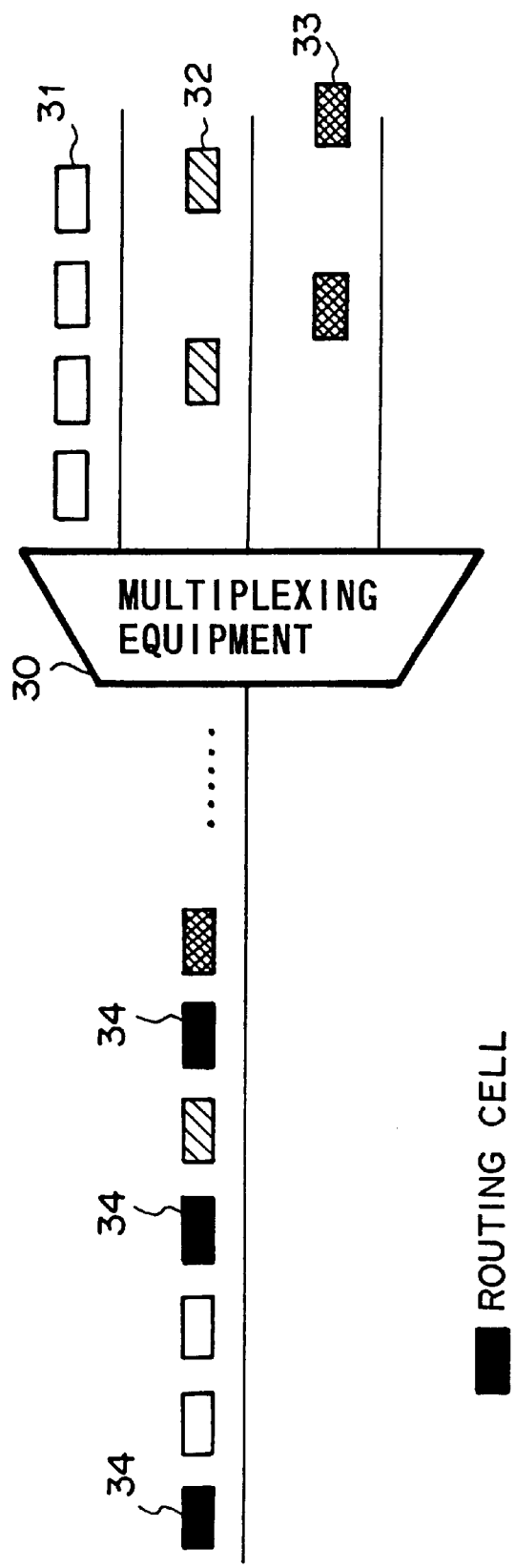
FIG. 3 is an illustration explaining the operation of the present invention.

At multiplexing connection points 24 and 25, in FIG. 2, RC(Routing Cell) 34 is inserted by multiplexing equipment 30 as shown in FIG. 3. As shown in FIG. 3, ATM cells 31,32 and 33 transported from different input ports are multiplexed, and outputted at single output port. RC 34 is inserted just in front of the ATM cell at each transporting input port.

Figure 1:
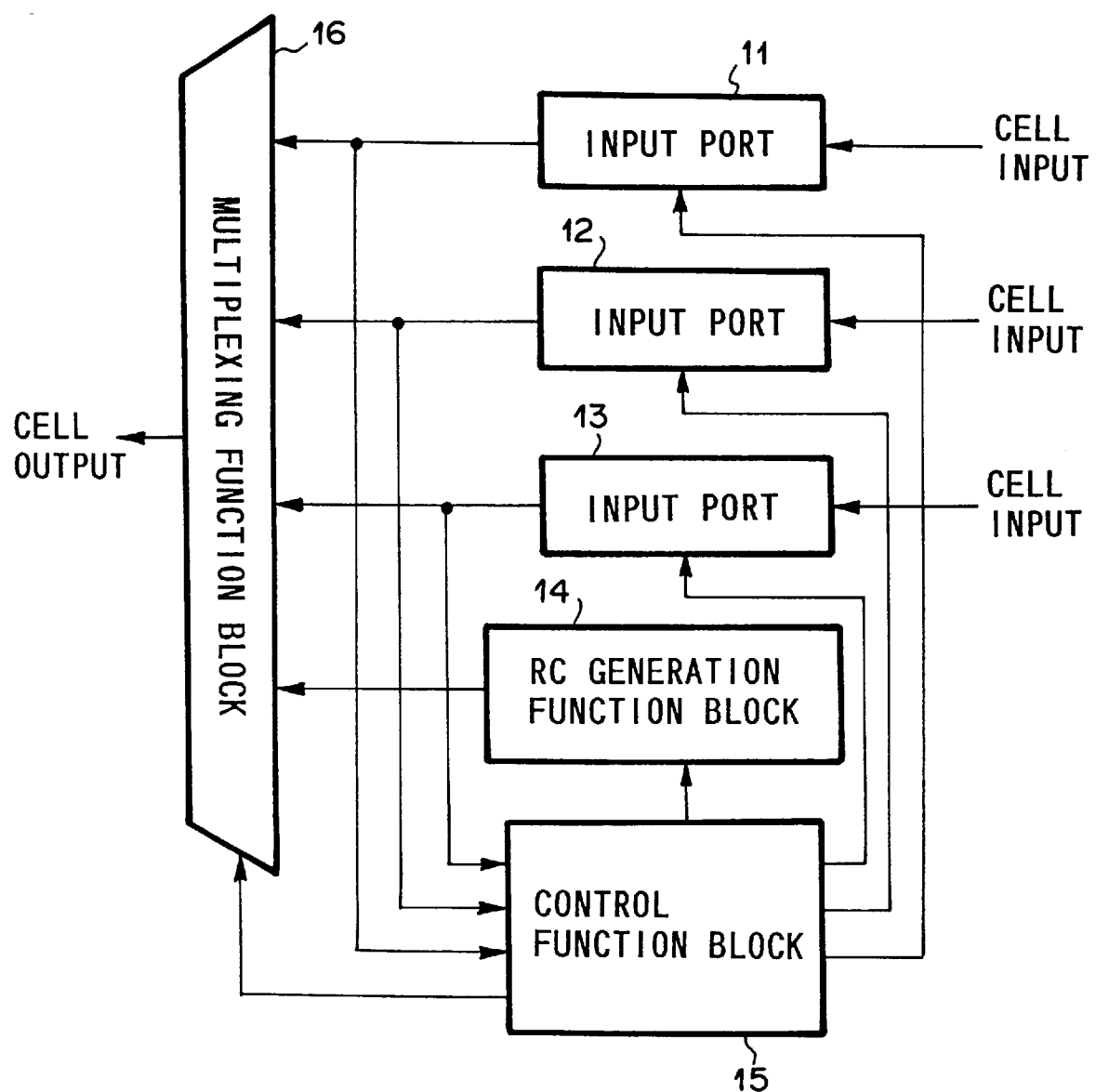
FIG. 1 is a block diagram of the mode of embodiment of the present invention.

The example of the construction of the multiplexing equipment shown in FIG. 3 is shown in FIG. 1. The inputted cell is once buffered at input ports 11~13. Then, by using, as a trigger, the control signal from control function block 15 to input ports 11~13, the inputted cells are transported from input ports 11~13 to multiplexing function block 16, and buffered here again.

The cell which is transported from input ports 11~13 to multiplexing function block 16, is transported simultaneously to control function block 15, and is analyzed there. As a result of the analysis, if RC be inserted, the control signal is sent from control function block 15 to RC generating function block 14, and RC generating function block 14, after detecting the control signal, generates RC (Routing Cell) 34 and transfer it to multiplexing function block 16.

Multiplexing function block 16 outputs immediately the transported RC. Control function block 15 sends uninterruptedly the control signal to multiplexing function block 16, and multiplexing function block 16 manages the buffered cell, detecting the control signal. After all, multiplexing function block 16 outputs the control signal, if the cell is a user cell. On the other hand, it discards the control signal, if the cell is RC. As a result of the analysis, if RC needs not to be inserted, the control signal is sent immediately from control function block 15 to multiplexing function block 16, and the cell buffered at multiplexing function block 16 is managed likewise.

Figure 4:
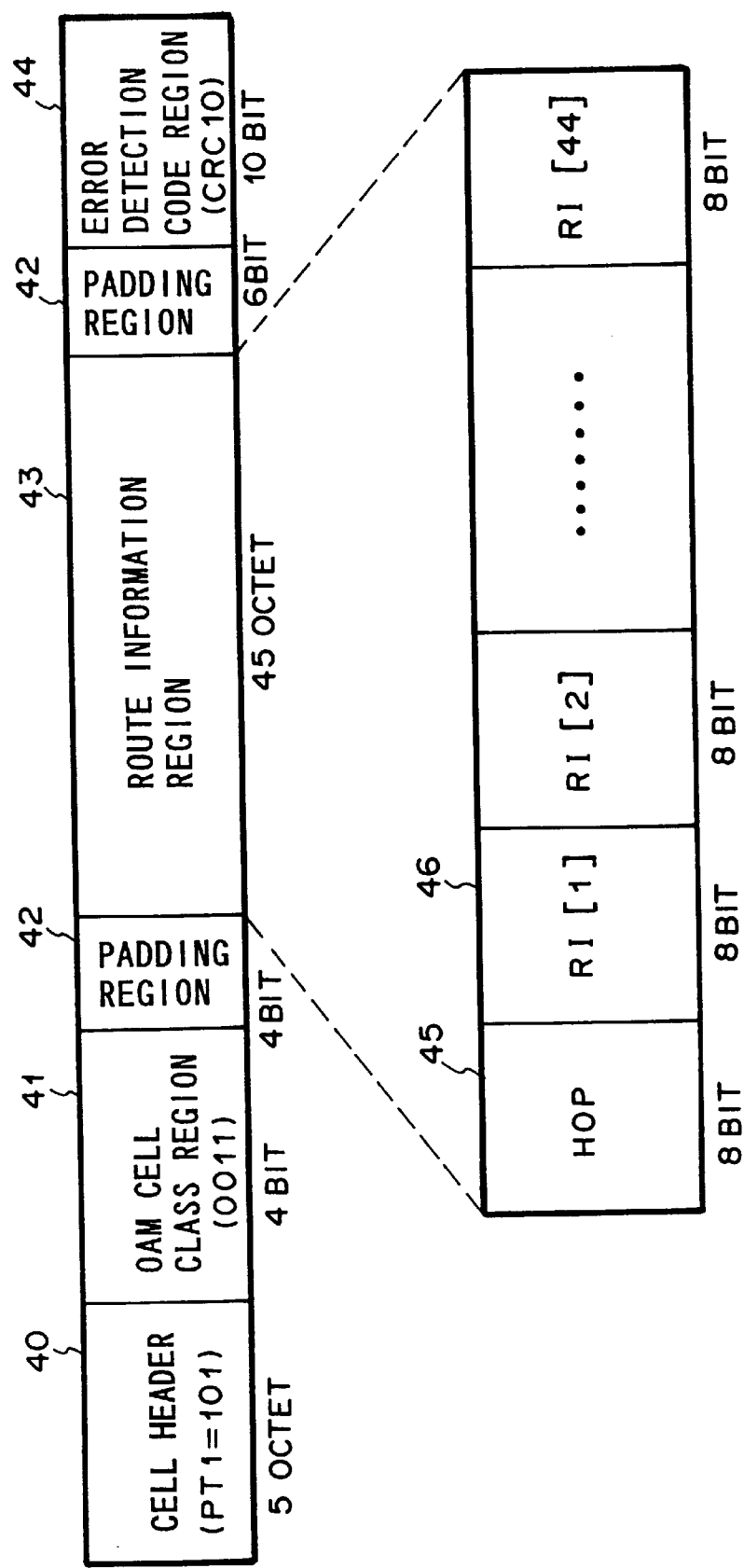
FIG. 4 is a figure showing the RC (Routing Cell) format used in the present invention.

Next, the self format of RC in the present invention is explained, referring to FIG. 4. RC is based on OAM (Operation Administration and Maintenance) of end-end F5 flow. 5 octet cell header region 40 is header of ATM cell, and PTI (Payload Type identifier) has the value 101 showing the OAM cell of end-end F5 flow of OAM cell. 4 bit OAM cell class region 41 uses the unused value (for example 00011) to indicate that it is RC(Routing Cell).

PADDING region 42 holds padding information. 10 bit error detection code region 44 is used for error detection by CRC 10. 45 octet route information 43 consists of the 8 bit Hop region for counting the number of multiplexing and RI region 46 for indicating past record of multiplexing.

For example, if the payload of RC received at receiving node is such that Hop=3, RI[1]=2, RI[2]=1, RI[3]=3, it is understood that this specific packet passes three multiplexing connection points and that its transmitting node is identified by the value 3-1-2 seen from the receiving node.

Figure 5:
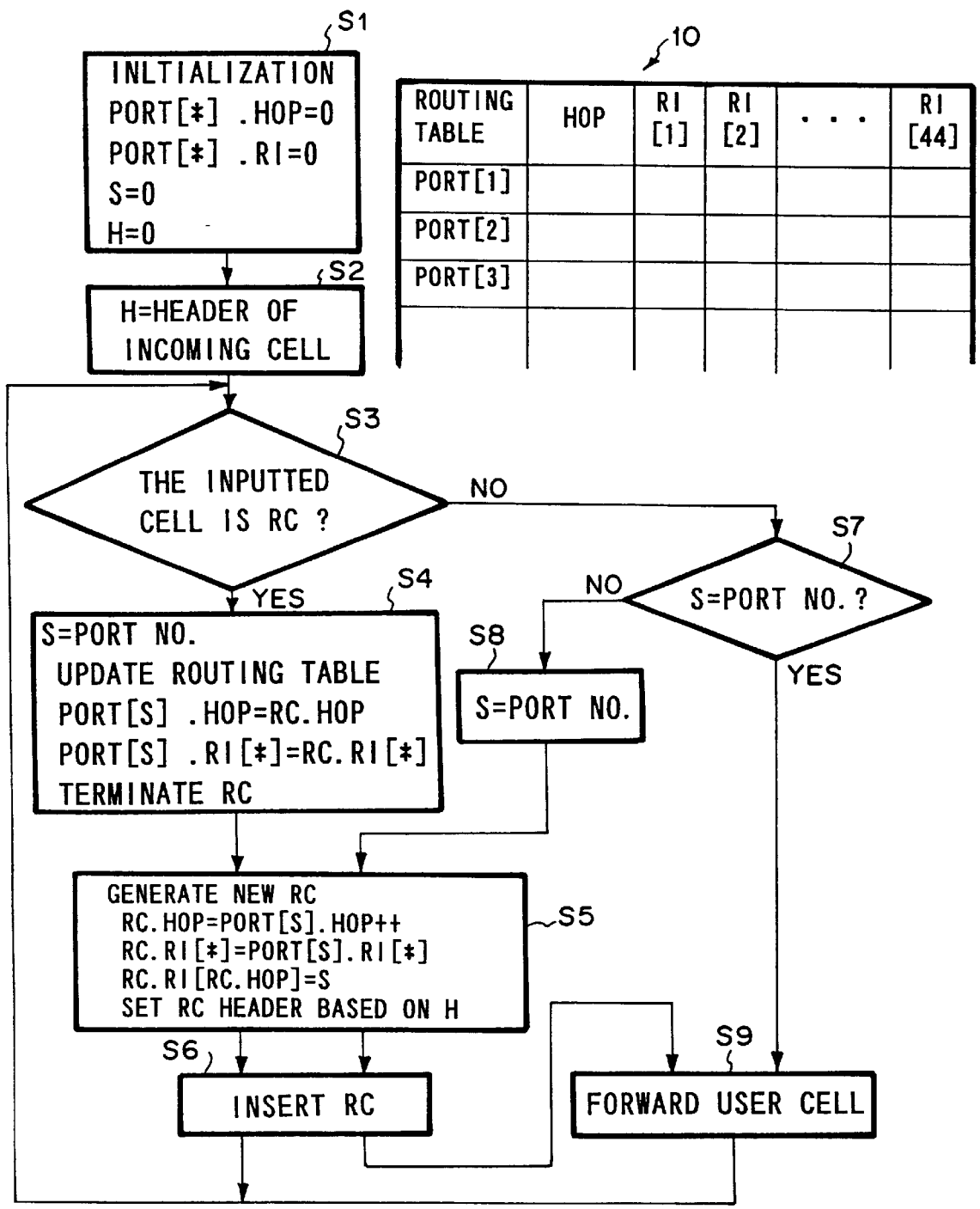
FIG. 5 is a flow chart explaining the operation of the present invention.

FIG. 5 shows a flow chart of the insertion of RC, corresponding to the actions of control function block 15 and RC generating block 14 in FIG. 1. The function block which manages the flow of FIG. 5 has Routing table 10, and the registers S and H, where routing table 10 of Hop (45 in FIG. 4) and RI (46 in FIG. 4) exists for every input port. In Routing table 10, the port number n of Port [n] is shown actually.

First, in the step 1, the contents of the above mentioned registers S and H and Routing table 10 are initialized to 0.

Next, in the step 2, ATM cell transported from input port is analyzed, and header information (VPIIVCI) is stored in the register H.

Continuously, in the step 3, cell header and OAM function class field are inspected to identify whether the ATM cell is RC or not. In the step 3, if the ATM cell is found to be RC, the input port number [S] is memorized in the step 4, and the Routing table 10 is renewed according to the information of RC in the step 4.

Exactly, the value of Hop field of RC is copied into the Hop field of Port[S] in Routing table 10, and the corresponding value of RI of RC is copied into each RC field in the step 4. This RC is once terminated in the step 4.

After the step 4, RC is generated again immediately in the step5, and inserted in the step 6.

In the step 5, the value such that the value of Hop field of Port[S] is incremented by 1 is buried into the Hop field of the generated RC, and the value of the corresponding RI of Port[S] is copied into all the RI field, and, furthermore, the value of the register S indicating the port number is written in RI[Hop] of RC where Hop is the value after the increment.

Also, while the memorized value of H is written in the header of RC, PTI field is put to be 101, and the OAM cell class field is put to be 0011. Afterwards, Padding and CRC 10 are added.

Further, when ATM cell is not found to be RC in the step 3, then the step 7 is executed.

If the number of the input port where cell is transported is the same number as the value of the register S, the cell is outputted immediately without inserting RC in the step 9.

On the other hand, If they are not identical, the value of the number of the input port is set in the register S in the step 8, and then the step 5, the step6, the step 9 are followed.

Namely, concerning the cell transported continuously from the same port, when the cell is RC, the multiplexing means of the present invention once terminates the RC, increments its value of Hop by 1, inserts new RC by writing the port number in the RI[Hop], transports the following user cell as it is into output line. When cell is transported from different port, if the first cell is a user cell, then "1" is written in Hop, generates new RC[1], and insert it in front of the said user cell. Thereby, the payload information of RC can uniquely correspond to each physically different transmitting node, multiplexed cell can be distinguished at receiving node.

FIG. 6 shows an example of the construction to restore AAL5 packet at receiving node, where block 60 is the characteristic portion of the present invention. Cell sequence including RC is inputted in separation function block 61. In RC analysis function block 65, cell inputted into separation function block 61 is monitored, and RC is analyzed, and control signal is sent to separation function block 61.

Based on the above mentioned control signal, separation function block 61 distributes input cell sequences for buffer function blocks 62, 63 and 64 for each transmitting node. Then, the cell sequences are transported under packet unit to SAR (Segmentation And Re-assembly) function block 67 through multiplexing function block 66. Thereby, AAL5 packet is assembled normally in SAR function block 67.

As a result of inserting RC(Routing Cell), the present invention can improve the efficiency and performance of ATM multicast communication by implementing a multiplexing system, wherein ATM cells can be identified at receiving node by using AAL5 which is more efficient than usual AAL3/4.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A method of asynchronous transfer mode (ATM) communication comprising the steps of:
   inputting ATM cells at a plurality of different input ports all having a same destination receiving node;
   buffering said ATM cells and simultaneously sending said ATM cells to a controller;
   analyzing said ATM cells in said controller to determine the input port where said ATM cell was input; .
   inserting a routing cell in front of said ATM cells at each of said different ports to identify the input port of said ATM cells in said receiving node; and
   multiplexing said routing cells and said ATM cells into a single stream.

2. The method of ATM communication according to claim 1, wherein said routing cell comprises a route information region indicating through how many multiplexing stations a corresponding ATM cell passed and a value indicating the originating input port.

3. The method of ATM communication according to claim 1, wherein said ATM cells are the ATM cells of AAL5.

4. An asynchronous transfer mode (ATM) cell multiplexing system, comprising:
   a transmitting node comprising:
   a plurality of input ports for inputting ATM cells; and
   ATM cell multiplexing means for receiving said ATM cells from said plurality of input ports and inserting, in front of ones of said ATM cells originating at each of the different input ports, a routing cell containing routing information and past record information indicating an originating input port for said ATM cells;

a receiving node, comprising:

analysis means for detecting routing cells from said ATM cells; and separation means for distributing said ATM cells on the basis of the information of said routing cells.

5. A receiving node for restoring AAL5 packets, comprising:

an input for receiving a mLidiplexed stream, said stream comprising a plurality of AAL5 asynhronous transfer mode (ATM) cells originating from different transmitting nodes and routing cells inserted between said ATM cells originating from different transmitting nodes;

analysis means for identifying and analyzing said routing cells and outputting a control signal;

separation means for demultiplexing said stream and separating said ATM cells according to said transmitting node wherein said particular ATM cell originated on the basis of the control signal from said analysis means;

a plurality of buffer means corresponding one by one to said transmitting nodes for accepting and buffering each separated ATM cell;

multiplexing means for accepting and multiplexing said ATM cells from said buffer means; and a segmentation and re-assembly (SAR) means for segmenting, re-assembling and transmitting said ATM cells multiplexed by said multiplexing means.

6. An asynchronous transfer mode (ATM) cell transmission system, comprising:

a plurality of transmitting nodes for transmitting ATM cells connected by a path to a same receiving node;

a plurality of multiplexing means located at junctions along said path, each of said multiplexing means for inserting a routing cell in front of ones of said ATM cells originating from each one of said transmitting nodes and multiplexing said routing cell and said ATM cells, said routing cell containing routing information regarding corresponding ATM cells and transmitting node identification for said corresponding ATM cells, wherein said receiving node can separate said ATM cells according to said transmitting nodes by analyzing said routing cells.

7. An asynchronous transfer mode (ATM) cell transmission system as recited in claim 6, wherein said ATM cells are AAL5 format.

* * * * *